US010443025B1

(12) United States Patent
    Miller (10) Patent No.: US 10,443,025 B1
(45) Date of Patent: Oct. 15, 2019

(54) WINE BOTTLE PRESERVER

(71) Applicant: WiseWine, Inc., Cascade, IA (US)

(72) Inventor: Kevin C. Miller, Cascade, IA (US)

(73) Assignee: WiseWine, Inc., Cascade, IA (US)

( * ) Notice: Subject to any disclaimer, the term of this patent is extended or adjusted under 35 U.S.C. 154(b) by 245 days.

(21) Appl. No.: 15/363,340

(22) Filed: Nov. 29, 2016

Related U.S. Application Data

(60) Provisional application No. 62/262,598, filed on Dec. 3, 2015.

(51) Int. Cl.

| | | |
|---|---|---|
| *B01F 3/04* | (2006.01) | |
| *C12H 1/12* | (2006.01) | |
| *B65D 39/00* | (2006.01) | |
| *B65D 51/24* | (2006.01) | |
| *B65D 47/24* | (2006.01) | |
| *B67D 1/04* | (2006.01) | |

(52) U.S. Cl.
    CPC ........... *C12H 1/12* (2013.01); *B01F 3/04099* (2013.01); *B01F 3/04794* (2013.01); *B65D 39/0005* (2013.01); *B65D 47/248* (2013.01); *B65D 51/24* (2013.01); *B67D 1/04* (2013.01)

(58) Field of Classification Search
    CPC ............. B01F 3/04099; B01F 3/04794; B01F 3/04787; B67D 1/04
    USPC ............ 99/323.1, 323.2, 277.1; 261/DIG. 7, 261/DIG. 65, 65; 141/19, 59, 64, 98; 222/399, 394, 400.7; 137/329.4
    See application file for complete search history.

(56) References Cited

U.S. PATENT DOCUMENTS

| | | | | |
|---|---|---|---|---|
| 3,612,354 A | * | 10/1971 | Sitton ................. | B67D 1/1466 137/614.19 |
| 4,706,847 A | * | 11/1987 | Sankey ................... | B67D 1/04 137/329.4 |
| 4,940,212 A | * | 7/1990 | Burton ................ | B01F 3/04794 141/382 |
| 5,586,588 A | * | 12/1996 | Knox ....................... | B67D 1/04 141/18 |
| 7,287,670 B2 | * | 10/2007 | Yoshida ............... | B67D 3/0003 222/1 |
| 8,453,888 B2 | * | 6/2013 | Sommerfield ....... | B67D 1/0406 222/129 |
| 2015/0129618 A1 | * | 5/2015 | Peirsman ................ | B67D 1/14 222/399 |

* cited by examiner

*Primary Examiner* — Reginald Alexander
(74) *Attorney, Agent, or Firm* — Shuttleworth & Ingersoll, PLC; Jason Sytsma (57) ABSTRACT

A wine preservation system comprises of a stopper for inserting into a wine bottle to seal the contents of the wine bottle. A trigger assembly is selectively attached to the stopper to open the stopper for simultaneously replacing wine from the wine bottle with gas. A refillable source is combinable with the trigger assembly for supplying the gas.

15 Claims, 8 Drawing Sheets

WINE BOTTLE PRESERVER

This application claims priority to U.S. Provisional Patent Application No. 62/262,598 filed on Dec. 3, 2015, the contents of which are hereby incorporated by reference herein.

BACKGROUND OF THE INVENTION

This disclosure relates to wine bottle accessories. More particularly, this relates to a wine dispensing and preserving system.

A number of wine preservation systems have been developed over the years to delay the spoilage of wine for a few days to allow an opened bottle of wine to hold its flavor and to stretch enjoyment of an opened bottle of wine. One such system is a vacuum pump incorporated with, or attachable to, a rubber "cork" with a one-way air valve. As used herein, a cork is an object used to seal a wine bottle—regardless of whether the object is actually made from traditional cork material, namely, the bark of a cork oak tree. In such a vacuum system, the user corks the bottle of wine and pumps out as much air as possible, hopefully leaving virtually no air in the bottle. The time by which spoilage of the wine is postponed in a bottle preserved with a hand-actuated vacuum pump is generally unsatisfactory.

Another mechanism which attempts to postpone wine spoilage uses an aerosol-style can to deliver pressurized gas into an opened wine bottle. The pressurized gas is typically a mixture of gasses believed to be inert with respect to wine. Once the gas mixture is sprayed into the opened wine bottle, the wine bottle is re-corked to seal the inert gas mixture within. Generally, the amount by which spoilage of wine is postponed using such prior art spray-can systems is unsatisfactory.

What is needed is a wine preservation system that quickly replaces oxygen in the wine bottle with an inert gas and seals the wine bottle to prevent spoilage.

SUMMARY OF THE INVENTION

A wine preservation system is disclosed. The wine preservation system comprises of a stopper for inserting into a wine bottle to seal the contents of the wine bottle. A trigger assembly is selectively attached to the stopper to open the stopper for simultaneously replacing wine from the wine bottle with an inert gas. A refillable source is combinable with the trigger assembly for supplying the inert gas. As used in this disclosure gas or inert gas is a gas that does not interact with wine to cause spoilage.

The trigger assembly comprises of a first channel extending from the refillable source through the trigger assembly with a first valve positioned in the first channel. A trigger selectively opens and closes the first valve. The first valve can be positioned in a tube that defines a portion of the first channel. The tube can be combined to a mounting bracket that is combined to the trigger. The trigger moves the first tube linearly up and down causing the first valve to selectively open.

The stopper comprises of a valve that is selectively opened by engagement from the trigger assembly. In one implementation, the first valve of the trigger assembly and the valve of the stopper open simultaneously to allow gas to flow from the refillable source into the wine bottle. The valve of the stopper is combined to a movable valve seat that is depressed by the trigger assembly to simultaneously allow wine to flow out of the wine bottle around the movable valve seat and gas to flow from the refillable source into the wine bottle.

DETAILED DESCRIPTION OF THE INVENTION

Disclosed in FIGS. 1-4 is a wine preservation system 100 for replacing oxygen in an opened wine bottle 10 with an inert gas to inhibit oxygenation and spoilage of the wine inside bottle 10. Wine preservation system 100 comprises, generally, of a trigger assembly 200 that can selectively release inert gas from a refillable source 102 and a stopper 300 that is inserted into wine bottle 10 and cooperates with trigger assembly 200 to control the flow of inert gas into wine bottle 10 and wine out of wine bottle 1. Wine preservation system 100 can also comprise a refilling station 400, shown in FIG. 5, that is used to refill refillable source 102.

Figure 1:
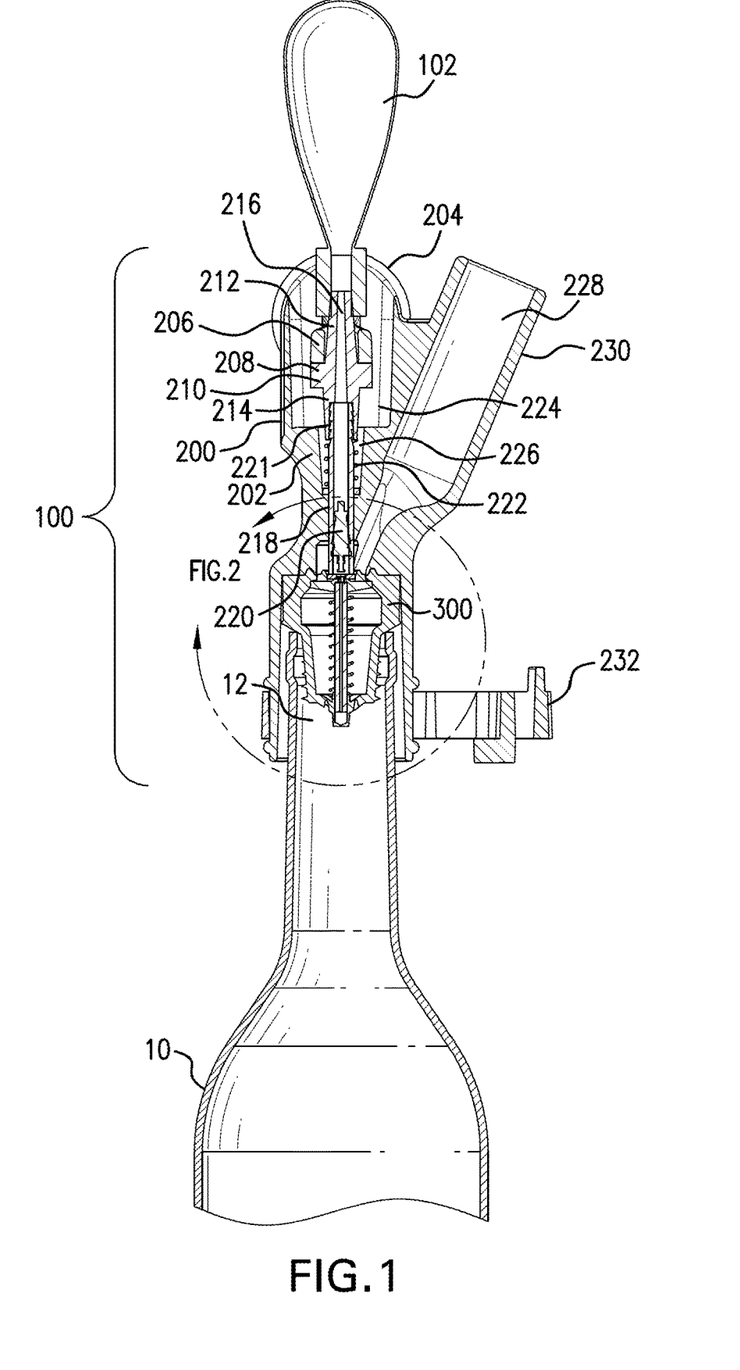
FIG. 1 shows a cross-sectional view of wine preservation system on a wine bottle.
Figure 3:
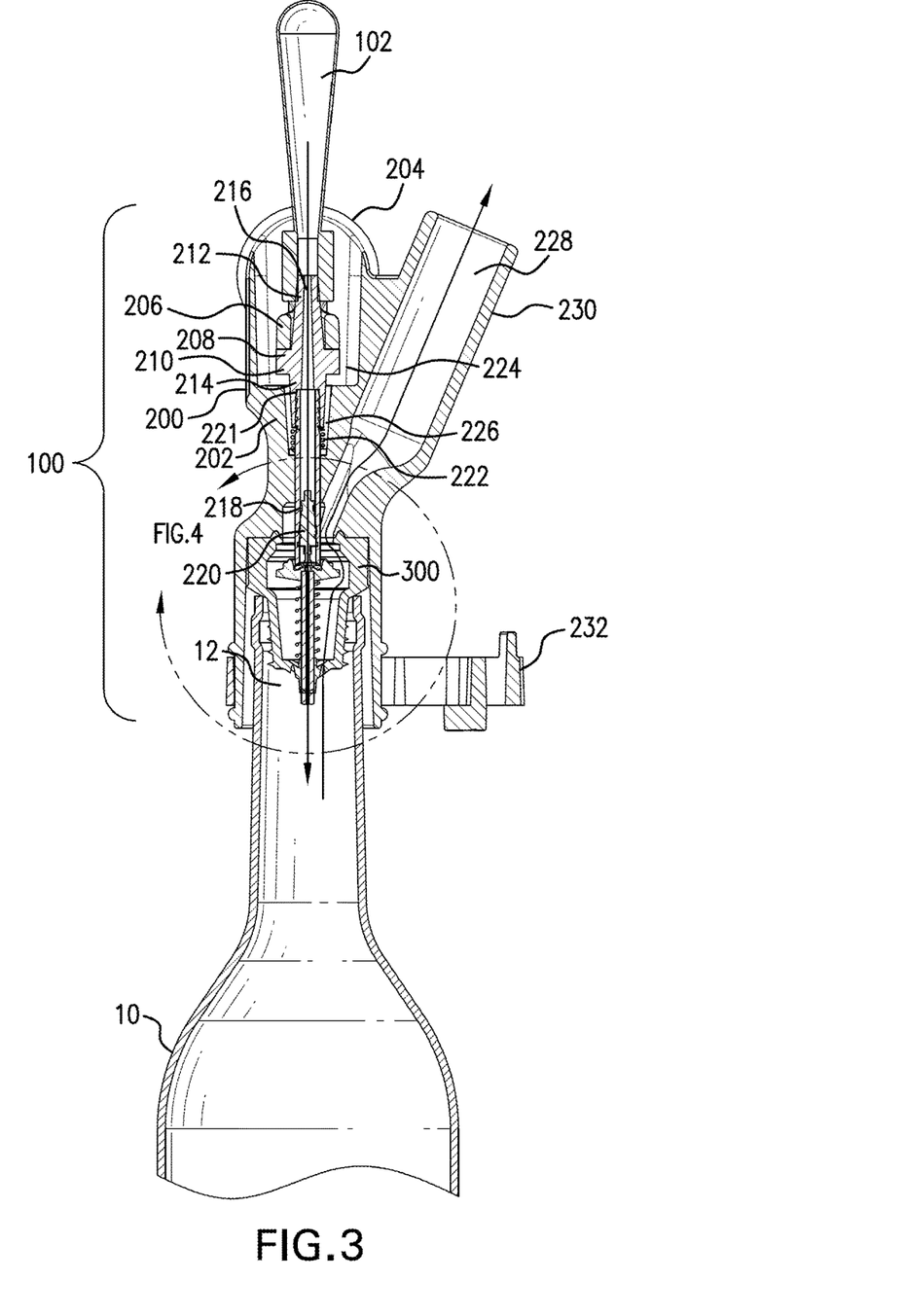
FIG. 3 shows a cross-sectional view of the wine preservation system of FIG. 1 in operation with the trigger pulled so that inert gas flows into the wine bottle to replace wine from the wine bottle.

Trigger assembly 200 of wine preservation system 100 comprises a body 202 that fits over a neck of wine bottle 10, as shown in FIGS. 1 and 3. Trigger assembly 200 comprises of a trigger that can be operated by the bartender to selectively open and seal refillable source 102. Trigger 204 has a knuckle 206 positioned inside body 202 that attaches trigger 204 to body 202. When trigger 204 is selectively squeezed and released, knuckle 206 moves down and up, respectively. Knuckle 206 is positioned to rest on a portion of mounting bracket 208.

Mounting bracket 208 comprises a round disc 210, on top of which rests knuckle 206 of trigger 204. A first column 212 extends upward of round disc 210 and a second column 214 extends downward of round disc 210. A first channel 216 extends through mounting bracket 208.

A tube 218 with barbs 221 on one end is frictionally engaged inside first channel 216 of second column 214 to extend first channel 216 through tube 218. A the bottom end of tube 218 is positioned a first valve 220.

First valve 220 can be a spring biased poppet valve that opens when gas pressure exceeds the biasing force of the spring or the poppet valve is pushed open. First valve 220 can be of the type commonly known as a "Schrader valve" or "American valve" found in automobile or bicycle tires. As shown more clearly in FIG. 2, first valve 220 is press fit inside tube 218, so that the only path of travel for the inert gas is through first valve 220 once it is pushed open, as described below.

Figure 2:
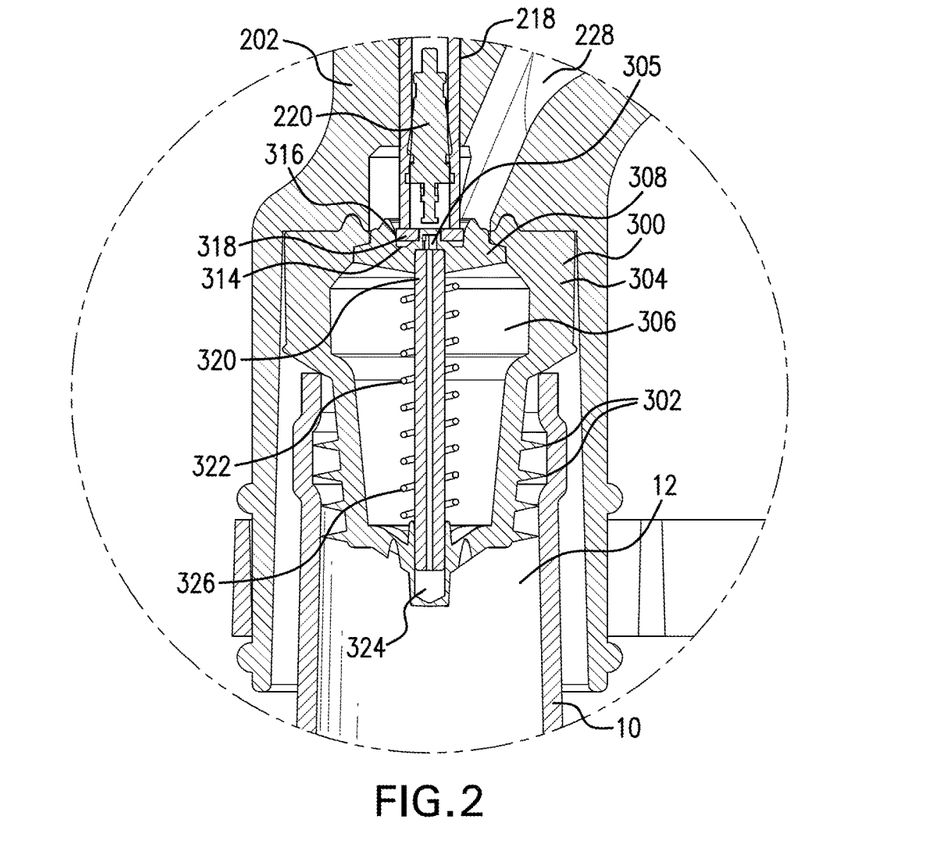
FIG. 2 shows a close-up view of area two of FIG. 1.

When trigger 204 is depressed, knuckle 206 of trigger 204 moves axially downward, which push mounting bracket 208 and tube 218 downward. Around tube 218 is a spring 222 that is used to bias mounting bracket 208 back up. Inside body 202 of trigger assembly 200 is a cavity 224 where knuckle 206 is positioned. Beneath cavity 224 is a secondary cavity 226 through which tube 218 extends to a ledge 227 inside trigger assembly 200. Inside this secondary cavity 226 is positioned spring 222 to provide spring biasing force between body 202 of trigger assembly 200 and mounting bracket 208.

Trigger assembly 200 also comprises of refillable source 102. Refillable source 102 is connected to mounting bracket 208 around second column 214 so that first channel 216 that extends through mounting bracket 208 and tube 218 extends into refillable source 102 to create a path of communication between refillable source 102 and first valve 220.

Refillable source 102, as shown in FIGS. 1 and 3, comprises an inflatable membrane 104 that expands and retract when filled with gas. In an embodiment, refillable source 102 can also comprise a spring 106 that extends between a top and a bottom of inflatable membrane 104. Spring 106 can be a spring steel coil spring that coils inflatable membrane 104 up as the gas is released. Such an arrange creates a pleasing compact package. Refillable source 102 will be discussed in more detail below.

Trigger assembly 200 also comprises a second channel 228 that is defined by a pouring spout 230. Second channel 228 is in selective communication with a bore 12 of wine bottle 10 for serving wine.

Trigger assembly 200 can further comprise of a clamp 232. Clamp 232 can be positioned at the bottom of body 202 of trigger assembly 200 around the portion that fits over the neck of bottle 10 to hold trigger assembly in firm engagement around bottle 10 and on stopper 300.

Stopper 300 of wine preservation system 100 replaces the cork of wine bottle 10 to seal bore 12 of wine bottle 10 after wine bottle 10 has been opened. FIG. 2 shows stopper 300 in greater detail. Stopper 300 can be inserted into bore 12 of bottle 10. Sealing ribs 302 on stopper body 304 provide an airtight seal to the inside of bottle 10.

Figure 4:
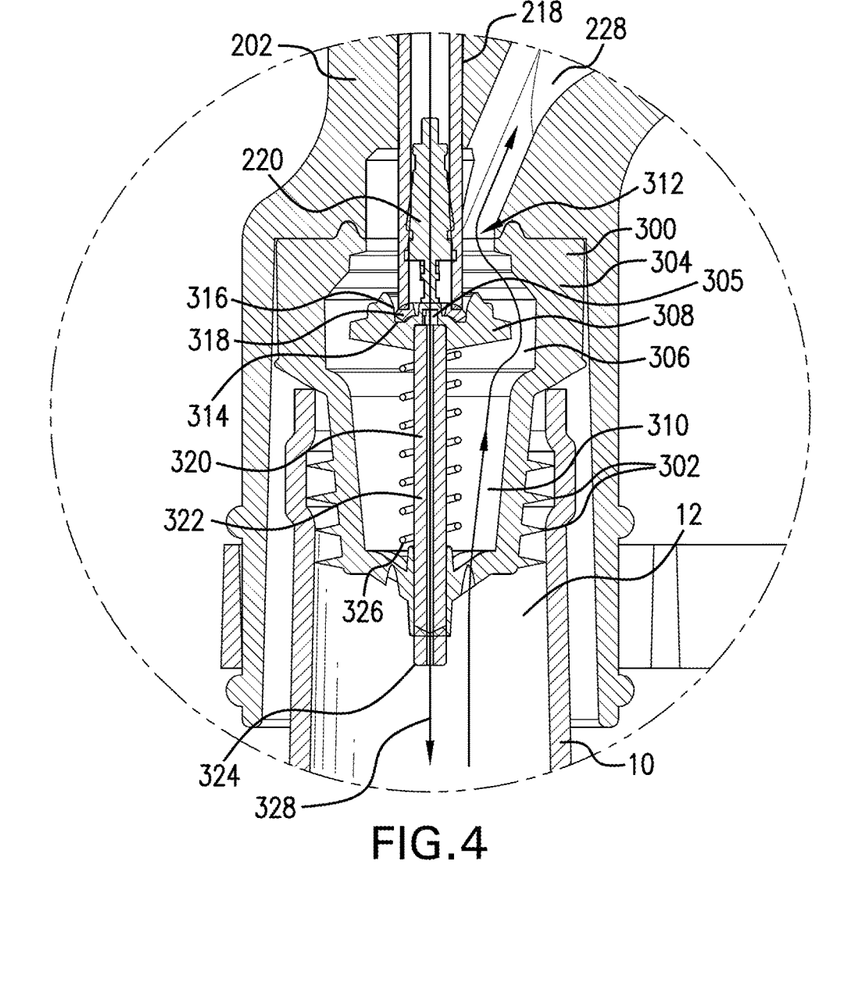
FIG. 4 shows a close-up view of area four of FIG. 3.

The inside of stopper body 304 can be hollow with an internal cavity 306. Cavity 306 can be sealed at the top with a movable valve seat 308 that can be selectively opened and closed. When opened, as shown in FIG. 4, wine can flow out through cavity 306, around movable valve seat 308, through second channel 228 and out an opening 312 in stopper 300, generally shown by arrow 310. When movable valve seat 308 is closed, as shown in FIG. 2, stopper 300 provides an airtight seal to the inside of bottle 10.

Movable valve seat 308 comprises of an indentation 314 that receives a valve 316. Valve 316 can be a washer type seal with a concentric opening 318 that opens when valve 316 is flexed. Beneath concentric opening 318 is positioned a valve stem 320 that extends downward in cavity 306 out a bottom of stopper body 304. Valve stem 320 has extending therethrough a first channel 322 that aligns with first channel 216 of trigger assembly 200 to provide a continuous channel of flow for the gas between refillable source 102 and the inside of bottle 10. At the bottle end of valve stem 320 is a one-way, check valve 324 that allows gas to flow out but not wine or oxygen to flow into first channel 322 of stopper 300. Check valve 324 can be a "duck valve" made of an elastomeric material that is shaped like the beak of a duck, which opens from the pressure of the gas flowing out of first channel 322 and closes when the gas is turned off.

A spring 326 can be positioned around valve stem 320 between movable valve seat 308 and the bottom of cavity 306 of stopper body 304. Spring 326 biases movable valve seat 308 closed.

FIGS. 2 and 4 show movable valve seat 308 in the close position and the open position, respectively. When trigger 204 is depressed, knuckle 206 of trigger 204 moves axially downward to push mounting bracket 208 and tube 218 with first valve 220 downward. Tube 218 pushes movable valve seat 308 downward, which opens up path 310 from the inside of bottle 10 through cavity 306, around movable valve seat 308, out opening 312 of stopper 300 and out second channel 228 of body 202 of trigger assembly 200.

Tube 218 of trigger assembly 200 also pushes against the outer concentric perimeter of valve 316, which cause valve 316 to flex and open concentric opening 318. First valve 220 is opened when first valve 220 contacts a center raised cylinder 305 in the middle of indentation 314 on movable valve seat 308. Center raised cylinder 305 also holds valve 316. Once valve 316 is flexed open, the pressure inside refillable source 102 opens pushes first valve 220 and pushes open check valve 324 so that there is a continuous path of flow of gas from refillable source 102 through first channel 216 in trigger assembly 200 and through first channel in stopper 300 into bottle 10, generally shown by arrow 328.

Figure 5:
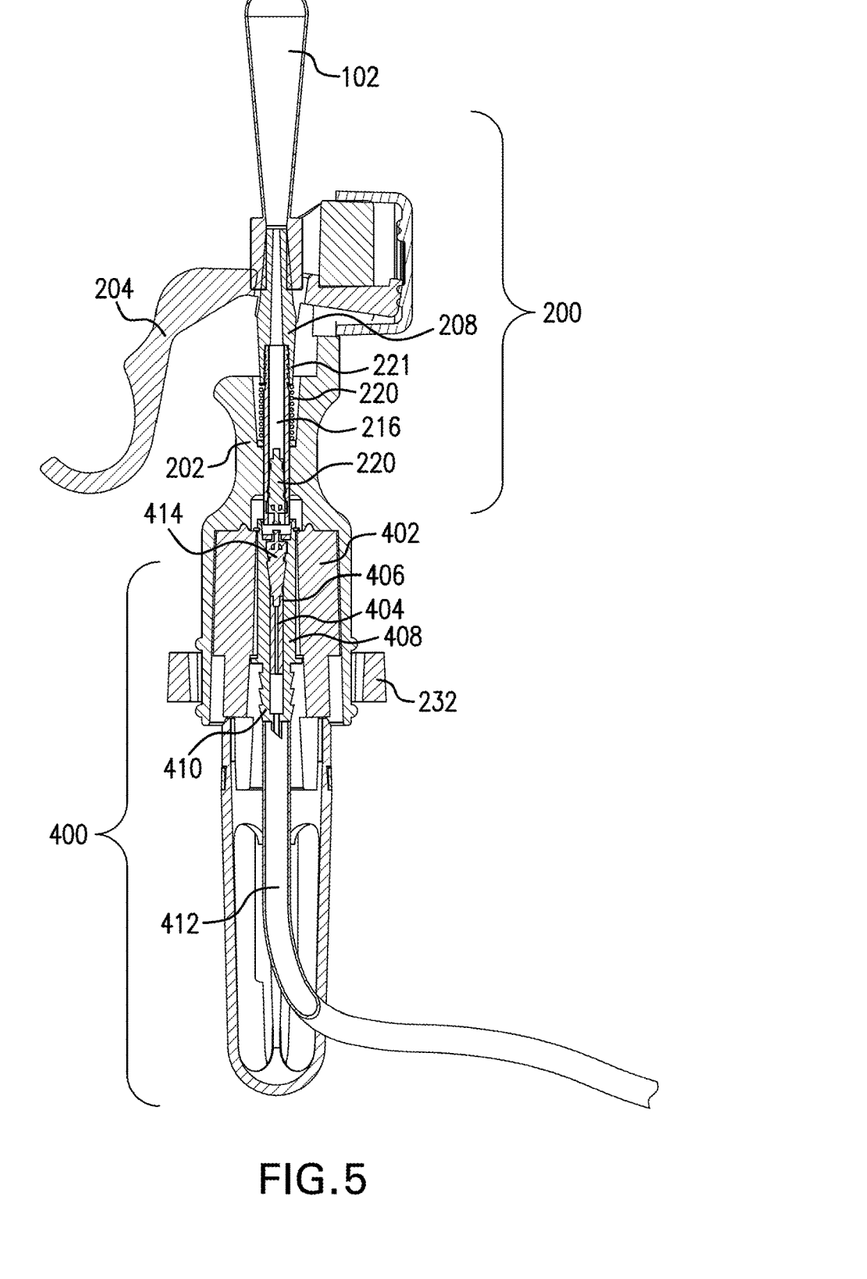
FIG. 5 shows a trigger assembly of the wine preservation system of FIG. 1 on a refilling station.

FIG. 5 shows refilling station 400 that is used to refill refillable source 102. Trigger assembly 200 can be removed from stopper 300 and attached to refilling station 400. Refilling station 400 comprises a station body 402 that can include legs to create a freestanding station. Inside station body 402 is a piercing pin 406 that has a first channel 404 that extends therethrough. First channel 404 is sealed at the top by a valve 414 that is similar to valve 220 in trigger assembly 200. Valve 414 opens when it is flexed open by the downward pressure of tube 218 of trigger assembly 200.

Piercing pin 406 can be surrounded by a tube 408 with a barbed end 410. Attached to barbed end 410 is a removable tube 412 that extends to an external refill supply of inert gas. To refill refillable source 102, the bartender operates trigger assembly 200 as discussed above by squeezing trigger 204, which flexes open valve 414 to allow inert gas from refill supply of inert gas to travel up through first channel 404, out valve 414 and through first valve 220 into and out of first channel 216 of trigger assembly 200 and into refillable source 102. When refillable source 102 is full or inflated, the bartender releases the trigger 204 to close valve 414.

In another implementation, the refill supply of inert gas comes from single use canisters. In this implementation, trigger assembly 200 is clamped onto the canister. When trigger 204 is squeezed, the downward force of piercing pin 406 punctures the seal on the top of the canister to allow the inert gas to flow into refillable source 102, in the manner described above.

Figure 6:
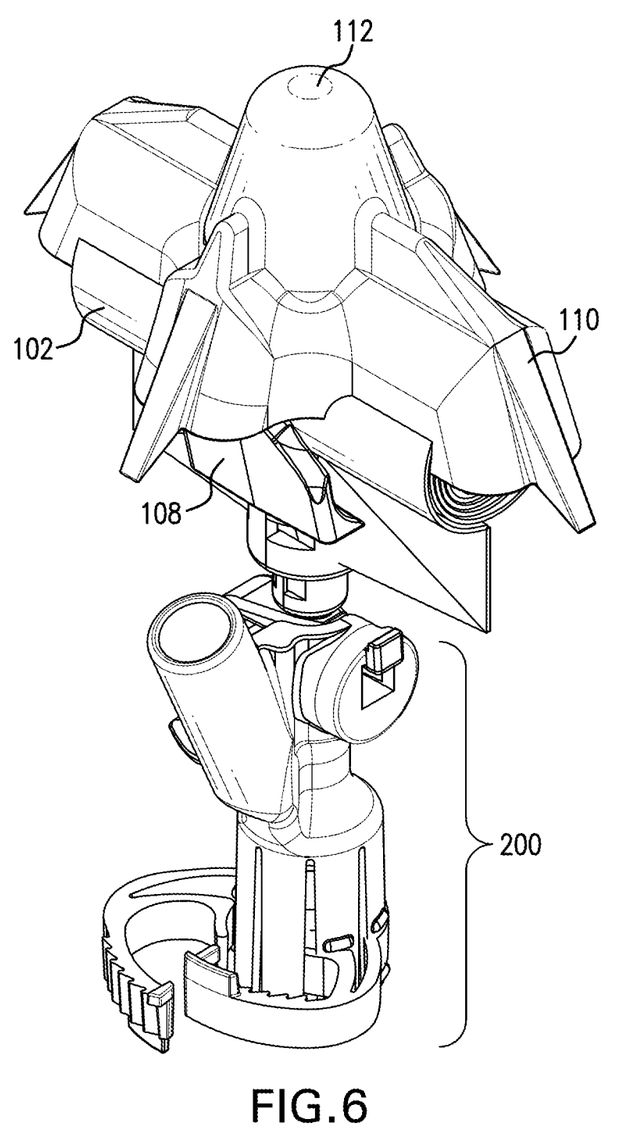
FIG. 6 shows a refillable source out of gas on the trigger assembly of the wine preservation system of FIG. 1.
Figure 7:
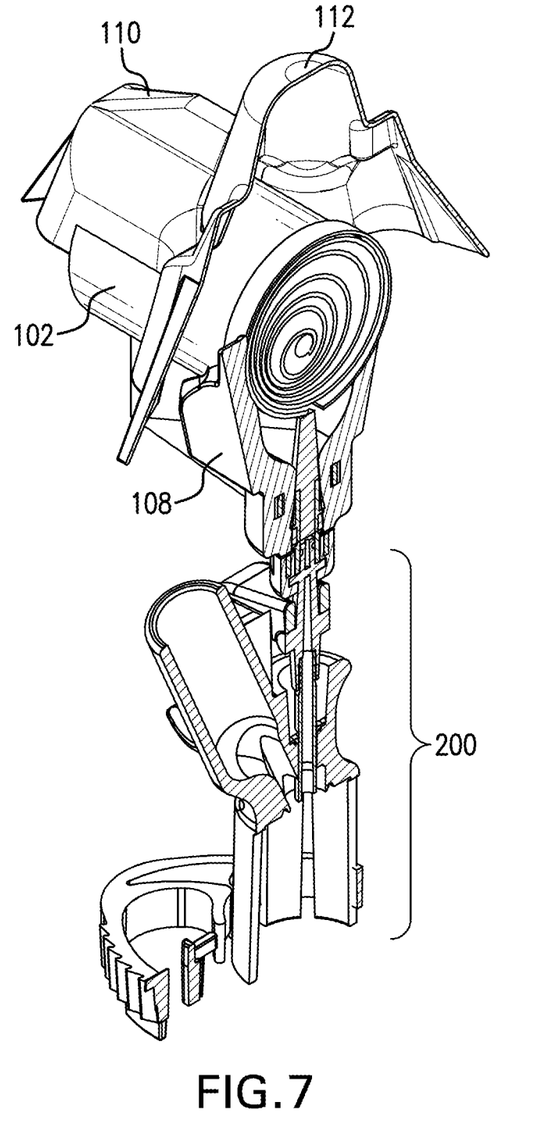
FIG. 7 shows a cross-sectional view of the refillable source and the trigger assembly of FIG. 6.
Figure 8:
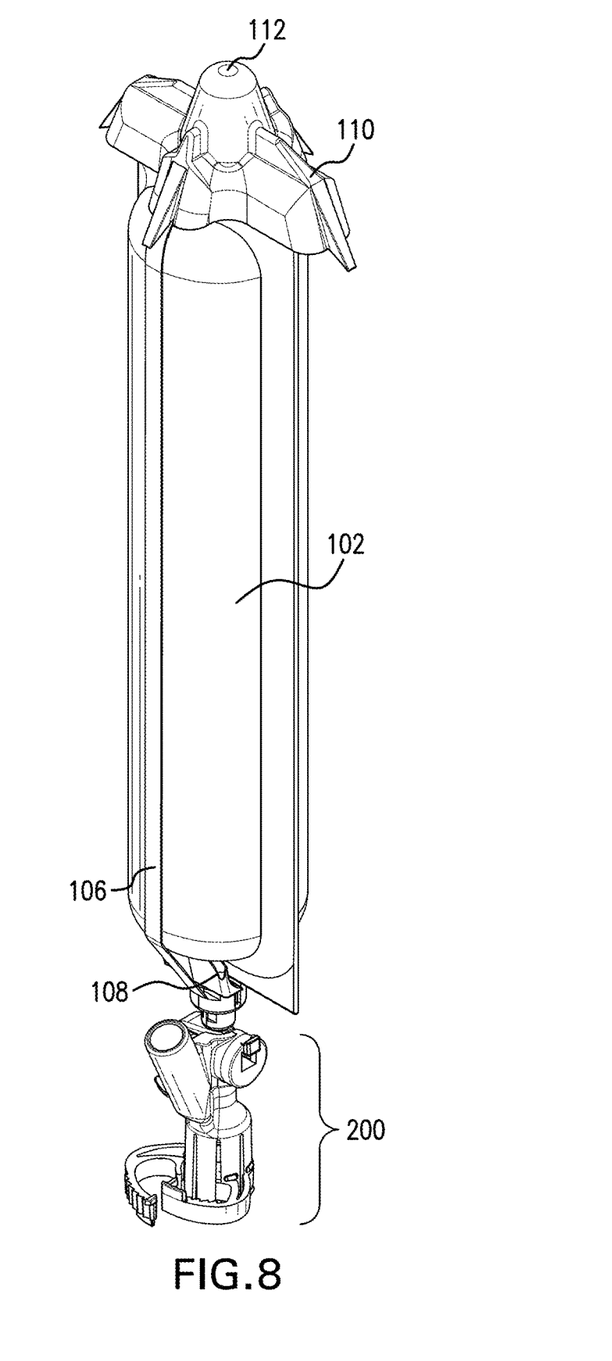
FIG. 8 shows the refillable source of FIG. 6 refilled with gas.

In another implementation, refillable source 102 is an inflatable membrane. In this implementation, refillable source 102 can be as simple as a balloon or the like. FIG. 3 shows refillable source 102 with inflatable membrane 104 and spring 106. In this implementation, a cradle 108 for holding inflatable membrane 104 in the coiled position, as shown in FIGS. 6 and 7 is provided. Cradle 108 can be covered by a cover 110. In an implementation where refillable source 102 is refilled by single use canisters, trigger assembly 200 can be combined to the single use canister as previously described. Refillable source 102 is rolled up an sitting inside cradle 108 and covered by cover 110. The single use canister has a seal that needs to be punctured. The bartender can slam cover 110 at its top 112 while pulling trigger 204, which cause piercing pin 406 to puncture the seal of the single use canister and release the inert gas to refill refillable source 102.

In yet another implementation, refillable source 102 comprises a single use canister, which is replaced with another canister after each use. In this implementation, a regulator is used to control the flow of gas and a piercing pin is positioned in first column 212 of mounting bracket 208. The piercing pin pierces the seal on the canister to allow the inert gas to flow into the regulator that maintain a constant low pressure.

In yet another implementation, refillable source 102 is an external refill supply of inert gas. Instead of hose 412 being connected to refilling station 400, a similar hose is connected to first column 212 of mounting bracket 208. In this implementation, wine preservation system 100 is tethered by a hose to an external refill supply of inert gas.

From the foregoing, implementations, it is apparent that this disclosure construes refillable source 102 broadly to covers refillable source 102 that is refilled by a refilling station, replaceable single use canisters, or attachment to an external supply of inert gas.

While the foregoing written description of the invention enables one of ordinary skill to make and use what is considered presently to be the best mode thereof, those of ordinary will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

What is claimed is:

1. A wine preservation system for replacing oxygen in a bottle of wine with an inert gas for preserving the wine, the wine preservation system comprising:
   a trigger assembly comprising a trigger, a first channel, and a second channel;
   a refillable source of inert gas combinable with the trigger assembly in communication with the first channel;
   a first valve disposed in the first channel for selectively opening and closing the first channel, wherein the trigger opens the first valve;
   a stopper body for inserting into a bore of the wine bottle to selectively seal the wine bottle;
   a movable valve seat in the stopper body for selectively opening the stopper body; and
   a valve combined to the movable valve seat, the valve comprising a first channel there through that is aligned with the first channel of the trigger assembly, wherein opening of the first valve of the trigger assembly by the trigger corresponds with opening of the valve of the stopper body for the inert gas to flow through the first channel of the trigger assembly and through the first channel of valve of the stopper body into the wine bottle while simultaneously wine from the wine bottle flows around the movable valve seat and out the second channel, wherein the trigger assembly further comprises a first tube that defines a portion of the first channel and a mounting bracket that receives the first tube.

2. The wine preservation system of claim 1, wherein the trigger assembly further comprises of a spring around the first tube positioned between the mounting bracket and a ledge inside the trigger assembly to bias upward the mounting bracket and the first tube.

3. The wine preservation system of claim 2, wherein the trigger of the trigger assembly engages the mounting bracket so that when pulled the mounting bracket and the first tube are pushed downward and the first tube pushes the movable valve seat downward.

4. The wine preservation system of claim 1, wherein the stopper body further comprises of a valve stem combined to the movable valve seat with a first channel that is in communication with the first channel of the valve of the stopper body.

5. The wine preservation system of claim 4, wherein the stopper body further comprises a spring around the valve stem between the movable valve seat and a bottom of an internal cavity of the stopper body to bias the valve seat closed.

6. The wine preservation system of claim 1, and further comprising a refilling station comprising a station body for receiving the trigger assembly, and a piercing pin comprising a first channel therethrough that is aligned with the first channel of the trigger assembly body, and a refill supply of an inert gas combinable to the piercing pin, wherein when the first valve is opened the inert gas from a refill supply of the inert gas flow through the first channel of the piercing pin and through the first valve and through the first channel of the trigger assembly body to the refillable source to refill the refillable source with inert gas for continued use.

7. The wine preservation system of claim 6, wherein the refill supply of inert gas is a single use canister with a seal piercable by the piercing pin of the refilling station.

8. The wine preservation system of claim 7, and further comprising a cradle combinable to the trigger assembly for holding the refillable source of the inert gas.

9. The wine preservation system of claim 8, and further comprising a removable cover combinable with the cradle to temporarily cover the refillable source of the inert gas.

10. The wine preservation system of claim 9, wherein the refillable source of the inert gas is an inflatable membrane.

11. The wine preservation system of claim 10, wherein the inflatable membrane is biased with a spring from a bottom of the membrane to a top of the membrane to bias the inflatable membrane in a retracted position.

12. A wine preservation system comprising:
   a stopper for inserting into a wine bottle to seal the wine bottle;
   a trigger assembly selectively attachable to the stopper to open the stopper for simultaneously replacing wine from the wine bottle with inert gas, wherein the trigger assembly further comprises of a first channel extending from the refillable source through the trigger assembly, and a first valve positioned in the first channel, a trigger for selectively opening and closing the first valve, and a first tube that defines a portion of the first channel, a mounting bracket that receives the first tube, wherein the trigger assembly is combined to the mounting bracket, and the first valve is positioned in the tube such that the trigger moves linearly the first tube causing the first valve to selectively open; and
   a refillable source combinable with the trigger assembly for supplying the inert gas.

13. The wine preservation system of claim 12, wherein the stopper further comprises of a valve that is selectively opened by engagement from the trigger assembly.

14. The wine preservation system of claim 13, wherein the first valve of the trigger assembly and the valve of the stopper open simultaneously to allow the inert gas to flow from the refillable source into the wine bottle.

15. The wine preservation system of claim 14, wherein the valve of the stopper is combined to a movable valve seat that is depressed by the trigger assembly to simultaneously allow wine to flow out of the wine bottle around the movable valve seat and the inert gas to flow from the refillable source into the wine bottle.

\* \* \* \* \*